Jan. 16, 1962   C. E. WILKENS ETAL   3,016,881
BRAKE BOOSTER UNIT
Filed Aug. 26, 1958   2 Sheets-Sheet 1

INVENTORS.
Carl E. Wilkens
Robert H. Bauman
BY
D. C. Staley
Their Attorney

Jan. 16, 1962 C. E. WILKENS ETAL 3,016,881
BRAKE BOOSTER UNIT
Filed Aug. 26, 1958 2 Sheets-Sheet 2
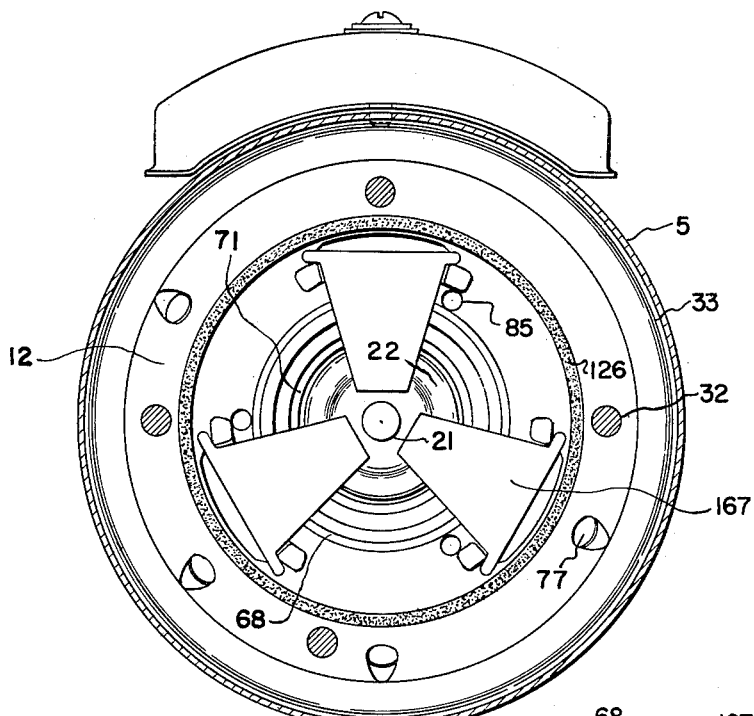
Fig. 2
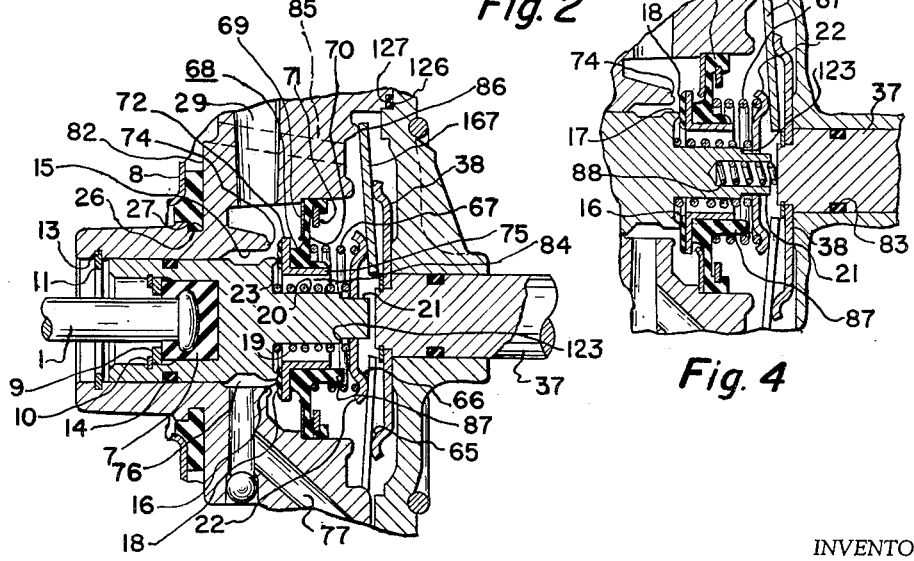
Fig. 3
Fig. 4
INVENTORS.
Carl E. Wilkens
Robert H. Bauman
BY
D. C. Staley
Their Attorney 3,016,881
BRAKE BOOSTER UNIT
Carl E. Wilkens and Robert H. Bauman, Dayton, Ohio, assignors to General Motors Corporation, Detroit, Mich., a corporation of Delaware
Filed Aug. 26, 1958, Ser. No. 757,261
9 Claims. (Cl. 121—41)

This invention relates to a power brake booster unit and more particularly to the valve control mechanism and reaction means within the power brake booster unit.

Various devices have been employed in transmitting reaction from the master cylinder to the manual control lever to provide a reaction force known as "feel." This reaction force may be proportioned between the power wall and the manual actuating means or it may be completely transmitted to the manual actuating means. It is most desirable to proportion this force and transmit a portion of the reaction against the manual control means. This invention incorporates a new and improved device to provide a more desirable "feel" and a valve control means operating within a power brake booster unit.

It is an object of this invention to provide an improved means of operation for the manually operated control valves which produce an improved feel in a power brake booster unit.

It is another object of this invention to provide a concentric vacuum valve and air valve operated by a manual control means whereby a resilient means is provided to maintain the air valve in an open position when in the normal or retracted position. A resilient means is also provided to retain the vaccum valve in a closed position when the power unit is in the rest or retracted position.

It is a further object of this invention to provide an improved soft feel during the initial operation of the manual control valve and also during initial movement of the power wall within the booster unit.

It is a further object of this invention to employ a resilient means operating to maintain said air valve in the open position when the booster is in the rest position to also function as a sole means for transmitting a component of the opposing force of the power wall return spring through the reaction proportioning device to the manual control means during operation of the first increment of movement in said air control valve. This resilient means operating against the air control valve is the sole means for transmitting the component of opposing force of the power wall return spring only so long as the air valve is in the open position. The air valve is concentrically mounted and sealed in an opening in the power wall and extending from the rear side of the power wall. The resilient means for maintaining the vacuum valve in a closed position when the booster unit is in the rest position also functions as a force transmitting member from the reaction proportioning device to the manually controlled air valve in cooperation with the resilient means operating against the air control valve when the air valve is closed and the vacuum valve is open during the initial movement of the air control valve. An additional resilient bumper is provided on the valve seat member which contacts the reaction proportioning device and thereby transmits a portion of the component of the opposing force of the power wall return spring together with the above mentioned resilient means.

It is a further object of this invention to provide in a brake booster a brake force reaction proportioning mechanism that provides for direct mechanical transmission of a component of the reaction force of pressurized fluid within the master cylinder to the power wall with a second portion of the component of the reaction force from the pressurizing fluid in the master cylinder being directly transmitted through resilient means to the manual control means during initial build up of reaction force to a predetermined value. This second component of reaction force beyond this predetermined value being transmitted to the manual control means directly through mechanical connection.

It is a further object of this invention to provide a proportioning means for transmitting a portion of the reaction force from the master cylinder to the manually controlled air valve and the remainder of such reaction force to the power wall within the power brake booster unit.

It is a further object of this invention to provide a concentric, or co-axial, air valve and vacuum valve operating with concentric, or co-axial, valve seats. The valve seat is resiliently held in contact with the vacuum valve when the booster unit is in the rest position. The air valve is manually operated and a concentric resilient means placed within said vacuum valve resilient means holds the air valve in spaced relation to the valve seat when the booster unit is in the rest position. These two springs and the bumper means on the valve seat member provide soft seating of the reaction proportioning device on the air valve member during initial operation of the power unit.

It is a further object of this invention to provide a modified version where a portion of the reaction force is carried directly from the fluid displacement member to manually controlled air valve by means of a resilient member compressively placed between these two members. This resilient means may be employed to return the manual control means to the return or retracted position. The air valve resilient means may also perform this function or aid in performing this function.

The objects of this invention are accomplished by means of a concentric valve means mounted within the power wall of the booster unit. The sliding air valve is concentrically mounted and sealed within a cylindrical opening in the power wall. The sliding air valve is provided with an annular valve portion on the forward side of a radial flange for engaging a concentric valve seat. The forward side of the radial flange extending inward from said valve portion operatively engages a resilient member. This resilient member is compressively placed between the sliding air valve and a reaction plate concentrically and slidably carried on the extreme forward end of the sliding air valve. The radially outer portion of this reaction plate engages reaction fingers on their radially inner end. The radially outer portion of the fingers engage a portion of the power wall where they are pivotally mounted on the wall. At an intermediate point on the opposite side or forward side of the reaction fingers, a reaction disc operatively engages the reaction fingers. This reaction disc is centrally mounted on its radially inner periphery where it rigidly engages the rearward end of the plunger which operates as a fluid displacement member within the master cylinder. The master cylinder and plunger and the booster unit casing as illustrated in this application are of a type of a conventional booster unit.

The power wall comprises a valve housing which contains a vacuum valve portion on its radially inner and forward portion for engaging the vacuum valve seat member which has a concentric portion engaged by the valve portion of a sliding air valve. The valve seat is constructed with a resilient flange to allow the radially inner cylinder portion to oscillate in an axial direction while the radially outer portion is rigidly mounted within the power wall. The radially inner cylindrical portion is operatively engaged on the forward end by a resilient member which engages the reaction plate on its opposite end. The cylindrical portion also has bumpers for engaging the reaction proportion device. It is these two resilient members and the bumpers which transmit the reaction force received from the proportional devices carried within the power wall of said power unit during the initial period of booster unit operation. It is noted that these two springs and the bumpers which carry the full reaction force which is transmitted to the sliding air valve initially and softly seat the rearward portion of the reaction proportioning device on shoulder of the forward portion of the sliding air valve, the sliding air valve being directly connected to the push rod of the manual operating means.

A third spring is employed in the modified version and compressively operates between the fluid displacement plunger and the sliding air valve.

Further objects and advantages of the present invention will be apparent from the following description, reference being had to the accompanying drawings wherein preferred embodiments of the present invention are clearly shown.

In the drawings:

FIGURE 1 is a cross-section view of the power brake booster unit. This view shows the structure of the air valve and a reaction force proportioning means contained within the power wall of the booster unit. The forward end of this booster unit discloses the cross-section view of a conventional master cylinder and plunger.

FIGURE 2 is a cross-section view taken on line 2—2 of FIGURE 1. This view shows the proportioning device and the mounting of the reaction fingers within the power wall of the power brake booster unit.

FIGURE 3 is an enlarged cross-section view of a valve assembly and the proportioning device contained within the power wall of the power brake booster unit. The valve shown in this view illustrates the air valve closed and the vacuum valve open in contrast to FIGURE 1 which shows the air valve open and the vacuum valve closed.

FIGURE 4 is a cross-section view of a modification of this invention where an additional spring is placed between air valve member and the fluid displacement member.

Figure 1:
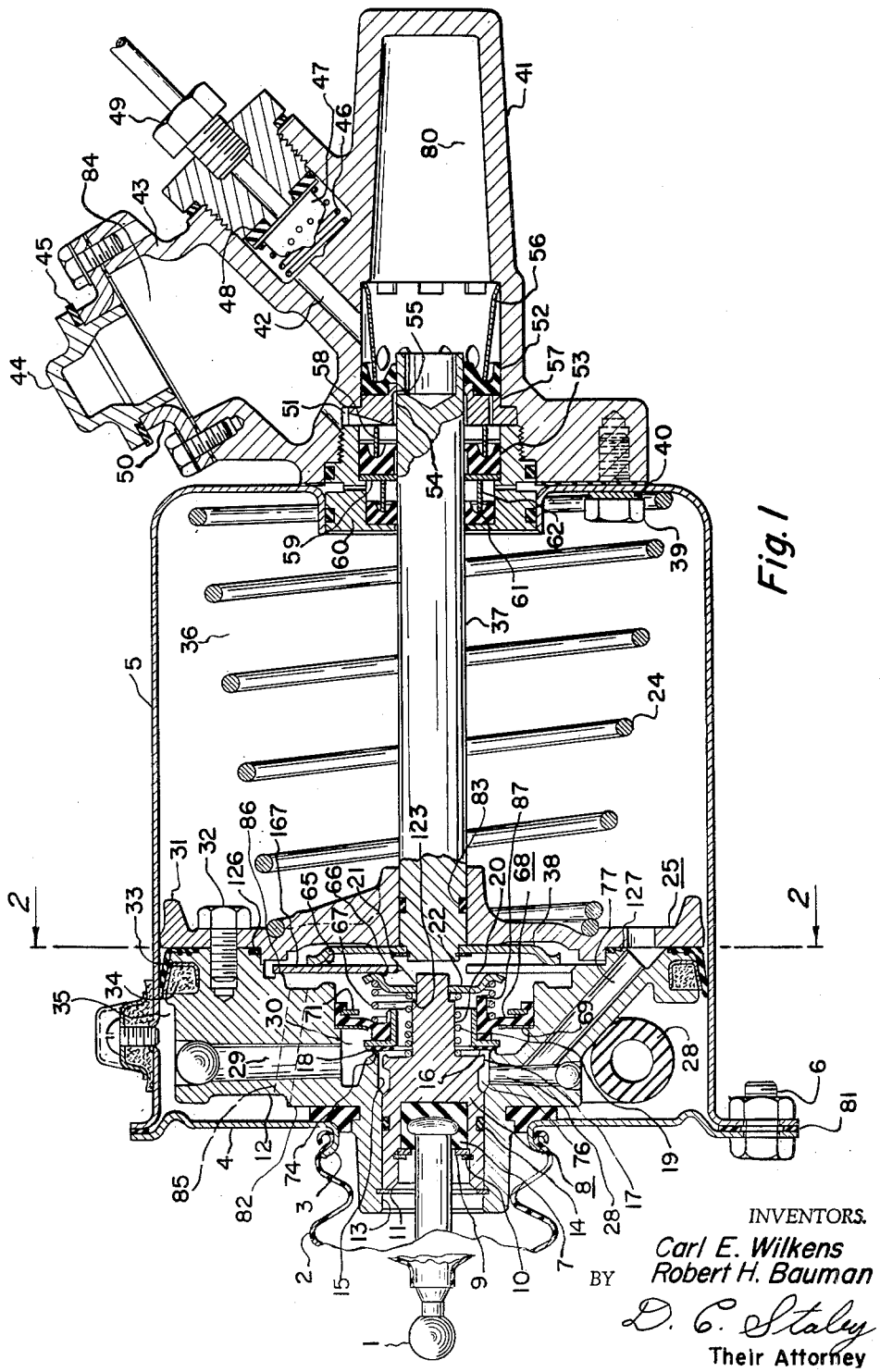

The illustrations contained within this patent application disclose a piston-type power wall operating within a brake booster unit. This application specifically relates to a valve mechanism and the proportioning device housed within this power wall. It is pointed out that the applicant does not wish to specifically limit this invention to operation within a piston-type brake booster unit. Reference may be had to other copending applications of the same assignee which illustrate this type of a device incorporated in a power wall employing a flexible diaphragm. These copending applications are Serial No. 757,259 filed August 26, 1958, now Patent No. 2,969,046, and Serial No. 759,260 filed August 26, 1958, now abandoned.

FIGURE 1 illustrates the assembly of the power brake booster unit. A push rod 1 is actuated by a conventional brake pedal not shown. Push rod 1 is provided with a sealing boot 2 which is mounted on the push rod and extends radially outward and forward to engage a flange portion 3 on the rear section 4 of the brake booster unit casing. The rear section 4 of the booster unit is assembled with a forward section 5 by means of bolts 6 and is sealed with a member 81 placed between the adjacent sections 4 and 5 of the power unit casing.

The push rod 1 extends axially inward to engage a resilient seat 7 mounted within the sliding air valve 8. This resilient seat 7 is maintained in position by a retainer ring 9 locked in position by a snap ring 10 which fits within a groove of the cylindrical opening on the rearward end of the sliding air valve 8. The axial rearward movement of the sliding air valve 8 is limited by the snap ring 11 which is placed within a groove within the inner periphery of the valve housing 12. The cylindrical inner periphery 13 of the air valve 8 on its rearward section provides for a guiding means for axial movement of the sliding air valve 8 within the valve housing 12. An O ring seal 14 is also disposed on the outer periphery of the sliding air valve which slidably engages the inner periphery 13 of the valve housing 12.

On the forward portion of the valve housing 12, an annular recess 15 is provided to allow for an opening passage, or chamber 76 around the outer periphery of the sliding air valve and the inner periphery of the air valve housing 12. This opening 76 extends forward to the vacuum valve 74 which operates in cooperation with valve seat 18. The air valve portion 17 is formed by an annular ridge on the forward side of a radial flange on the sliding air valve. The air valve operates in cooperation with valve seat 16. Adjacent to this annular ridge, the valve member extends radially inward to provide a flange portion which engages the air valve spring 19. The portion of the air valve forward of the radial flange extends to form a cylindrical end of reduced diameter in relation to the rearward section of the sliding air valve. This portion 20 of the sliding air valve extends forward and is of a diameter slightly less than that of the internal diameter of the spring 19. The extreme forward end of the sliding air valve is provided with an additional step portion or shoulder 123 to a smaller diameter indicated at 21 for receiving a reaction plate 22. A reaction plate 22 is slidably mounted on this reduced diameter 21 on the forward end of the sliding air valve. The air valve spring 19 is compressibly mounted against the reaction plate 22 and the radial flange 23 of the sliding air valve 8.

The valve housing 12, which is concentrically mounted in the power brake unit and provides the sliding guide for the air valve 8, is held in a retracted position against the rear section 4 of the brake unit casing by means of spring 24. This spring is operatively placed between the forward section 5 of the pressure unit casing and the power wall 25. A bumper 26 comprising an annular ring for reception within an annular groove 27 on the valve housing 12 is provided on the rearward side of the radial flange 82 of valve housing 12.

A vacuum conduit 28 is connected to a vacuum source not shown. This conduit is of a flexible composition and is connected to the power wall and passage 29. Passage 29 extends radially inward to the vacuum chamber 30 which is an annular opening extending within the power wall of the booster unit. The valve housing 12 forms the rearward portion of the power wall which is assembled to the reaction housing 31 forming the front portion of the power wall. The reaction housing 31 is mounted to the valve housing by means of bolts 32. A seal 126 comprising a ring seal is mounted between the valve housing 12 and reaction housing 31. An additional seal 33 is held between the valve housing 12 and reaction housing 31 at their outer periphery of the valve housing providing a sealing means for the power wall 25. The seals 33 and felt wick 34 provide a fluid-tight seal between the constant pressure compartment 35 and the variable pressure compartment 36.

The radially inner portion of the reaction housing 31 is slidably mounted on the rear end of the plunger 37. An O ring seal 83 is disposed in a groove on the plunger and slidably engages the inner periphery of the reaction housing 31. The return spring 24 maintains the power wall in the normal or rest position.

The forward end of the power booster unit is provided with seals between the vacuum chamber 36 and the fluid chambers within the hydraulic fluid compartment. The master cylinder is mounted on the booster unit by means of bolts 39 and washers 40. A master cylinder is formed within a unitary casting 41 which extends upward to include the fluid reservoir 43. A fluid reservoir is provided with a conventional cover plug 44 and seal 45. The passage 42 leads to the hydraulic wheel cylinders and fluid system, not shown, and contains a spring 46 and check valve 47 combined with the seal 48. A fitting 49 provides for connection to the hydraulic fluid braking system not shown. The chamber 84, contained within the reservoir of the master cylinder, is provided with a passage 51 extending between seals 52 and 53 to an opening 54. The opening 54 is in communication with the master cylinder through port 55 when the plunger 37 is in the rearward or rest position. The fluid seal 52 is held in position by means of a retainer ring 56. The fluid seal 52 is also supported on an annular ring 57.

Spaced between the annular ring 57 and seal 53 is an additional retainer ring 58. The seal 53 is mounted on an annular plate 59 which is retained in position within the fitting 60. The fitting 60 also contains the seal 61 which is held in position by the retainer ring 62.

The power wall contains the reaction device for proportioning the reaction force from the plunger 37 which is in contact with the fluid system for actuating the vehicle brakes. The reaction force is transmitted through the plunger 37 to the reaction disc 38. The reaction disc 38 is provided with an annular groove which forms a ridge portion 65 on its radially outer portion. This radially outer portion and ridge which is formed on the rearward side of the pressure plate contacts the reaction fingers 167 at their intermediate portion. The radially outer point of the reaction finger is mounted within the valve housing 12. The mounting of the reaction finger is more clearly shown in FIGURE 2, the reaction finger having a T-shaped structure which is supported within the cooperating slots within the valve housing 12. This type of a mounting provides for a pivoting action of the reaction finger when a force is applied at any point on the radially inwardly extending portion of the reaction finger. The inner portion of the rearward side of the reaction finger contacts a ridge portion 66 on the reaction plate 22. This ridge portion is formed by an annular groove stamped in the reaction plate. This annular groove forms a concentric mounting surface for the valve seat spring 67 on the rearward side of the reaction plate. The valve seat spring 67 is resiliently placed between the reaction plate 22 and the valve seat member 68. The force transmitted through plunger 37 pivots the reaction finger 167, thereby transmitting a portion of its force to its pivot mounting in the valve housing 12 of power wall 25. The remainder of the reaction force is transmitted through the reaction plate 22. This force, in turn, is transmitted through the valve seat spring 67 and the air valve spring 19 during initial operation of the sliding air valve.

The valve seat member 68 is concentrically mounted within the valve housing and abuts a radial flange member 69 which serves as a reinforcement along the flexible flange 70 of the valve seat member. The radially outer portion of valve seat member 68, which is mounted within the valve housing, extends forward and is provided with a groove for receiving a snap ring 71. The snap ring firmly seats the outer portion of the valve seat member 68 in fixed relation to the valve housing 12.

The radially outer portion of the valve seat member 68 is adjoined by a flexible radial flange 70 which extends inward to a cylindrical portion. The forward end of this cylindrical portion is provided with angularly spaced bumpers 87 on its forward end for engaging the reaction plate 22. The cylindrical portion, including the bumpers, the radial flange, and the portion on the outer periphery of the flange for mounting in the valve housing 12 are a unitary construction of a material which is resilient and flexible. A rigid member 72 is bonded to the inner periphery of the inner cylindrical portion of the valve seat member. This rigid member is cylindrical in shape and has a radial flange extending outward which is also bonded to the rearward portion of the cylindrical section of the valve seat member 68. This radial flange portion of the rigid section 72 provides a mounting structure for the valve seats 16 and 18. The valve seats 16 and 18 are of a resilient material which provides for a seal between the vacuum chamber 30 and air chamber 84 which in turn are alternately connected to the chamber 76 as the valves are opened and closed. The resilient spring 67 operates to axially move the valve seats 16 and 18 and the rigid member 72 as a unit with the cylindrical inner portion of the valve seat member. This action of the spring works in opposition to the movement by the air valve 8 as it moves forward upon actuation by manual means.

The power unit operates in the following manner. As the push rod 1 is moved forward by the manual means, the forward end of the push rod engages the resilient seat 7 and moves the air valve member 8 forward. Prior to contact of the air valve portion 17 carried on the air valve member 8 with seat 16, the air compartment 35 and compartment 36 are in communication with each other. Air chamber 84 is in constant communication with the constant pressure compartment 35 by means of passages 85. The chamber 76 is also in communication with passage 77 and variable pressure compartment 36. This places the power wall with air pressure on the forward side and the rearward side. As the air valve moves forward, the valve portion 17 contacts a valve seat 16. This contact closes off the chamber 76 from chamber 84. Up to this point, spring 19 is axially compressing and transmits the only back force felt by the operator. This movement of air valve 8 is the first increment of movement of the valve in its initial movement in establishing power operation of the power unit.

As the air valve 8 moves farther forward, the manual contact pressure of the air valve portion 17 of the air valve 8 increases on the valve seat 16 to disengage the valve seat 18 from the vacuum valve portion 74 with vacuum valve seat 18 in spaced relation to valve portion 74. The chamber 76 is closed off from the chamber 74 as an air-tight seal is provided between the valve portion 17 and the valve seat 16. From this point forward, the constant pressure compartment 35 and the variable pressure compartment 36 are no longer in communication with each other. The vacuum compartment 30 is placed in communication with compartment 76 as the valve seat 18 moves away from the vacuum valve portion 74 of valve housing 12. This places the vacuum source, which is directly connected with the conduit 28, in direct communication with passage 77 and the differential pressure compartment 36. This movement of the air valve 8 is the second increment of movement of the valve in its initial movement in establishing power operation of the power unit.

The back force transmitted through the reaction plate 22 of the reaction device continues to transmit force through the valve seat member spring 67 and the air valve spring 19. The combined forces between these two springs 67 and 19 is then transmitted completely through the air valve portions 17 and air valve member 8. The back force from the reaction device to the manual control means is transmitted by resilient means as described.

This opening of the vacuum valve creates a pressure differential on the power wall 25 that moves the plunger 37 forward to close the port 55. The plunger pressurizes the fluid within the master cylinder compartment 80. As the pressure builds up within the compartment 80, a reaction force is created on the forward end of plunger 37. This force on plunger 37 is transmitted to reaction disc 38. Reaction disc 38 bears against the reaction fingers 167 distributing the force between the pivot point 86 on the valve housing 12 and the ridge 86 on the reaction plate 22. A portion of the force from the reaction plate 22 is transmitted through the valve seat member spring 67 to the valve seat member 68 and through the air valve spring 19. This force is transferred rearwardly through a sliding air valve 8 through the mechanically operated control lever, not shown. For a predetermined distance from the point forward of where the valve portion 17 of the air valve contacts the valve seat 16, this initial reaction force felt by the operator is transmitted through the air valve spring 19, and the valve seat spring 67.

Forward movement of the power wall 25 together with the manual control means and air valve member 8 relative to plunger 37, increasing hydraulic pressure in the master cylinder chamber 80, will cause engagement of the bumpers 87 with reaction plate 22. The combined effect of springs 67 and 19 with bumpers 87 provide a dampened and softened reaction force or "feel" as the reaction disc 22 seats itself on the step, or shoulder 23 of the sliding air valve member 8. During the period of time from the opening of the vacuum valve to the seating of the reaction plate 22 on the shoulder 23 of the air valve 8, the reaction force is resiliently absorbed by the combined action of the springs 19 and 67 and the bumpers 87.

If this position of the air valve and vacuum valve is retained for any length of time, the pressure on the forward side of the power wall 25 or in compartment 36 decreases in relation to the compartment 35 on the rearward side of the power wall. This decrease in pressure in compartment 36 provides for movement of the power wall 25 to assist in the operation of the vehicle brakes. It will be noted at this point that, although the power wall moves forward, the "feel" transmitted to the push rod 1 will be a gradual and softened seating and unseating of disc 22 on shoulder 23 of air valve member 8. The brakes may be held in the "hold" position when both air and vacuum valves are closed. The proportioning of the force which is transmitted through the push rod 1 may be regulated by a predetermined leverage on the proportioning device.

The applicant wishes to point out that the air valve spring 19 and the valve seat member spring 67 may be of the same size and create relatively equal forces against the members which they resiliently contact; however, the preferred relative size would be where the air valve spring is of a larger size and thereby transmits the greater portion of the reaction force and provides the major control in regulating the time of engagement of reaction plate 22 with shoulder 23 of air valve 8. The applicant does not wish to limit the exact proportions of force created on these two springs as the relation between the two may vary somewhat under different circumstances.

Upon releasing of the brakes, the vacuum valve closes and then the air valve opens and the sliding air valve returns to the rest position on the snap ring 11. The air valve is held in this position by the air valve spring 19 and the valve seat 18 is held in contact with the vacuum valve 74 by means of spring 67. The power wall is returned to the rest position in the rearward end of the power cylinder by means of spring 24.

A modification of this invention employs an additional spring between the air valve member 8 and the fluid displacement plunger 37. This spring 88 is held under constant compression between these two members. The addition of this spring provides for a more constant brake pedal force or "feel" throughout the stroke of the manually controlled member. This spring 88, combined with spring 19, may be of such size that they will provide for the return of the brake pedal in its retracted position. Any relative size of these three springs could be used and the applicant does not limit the invention to any relative size.

As the manual control means is actuated, the sliding air valve moves forward compressing spring 88 which is directly between the sliding air valve and the plunger 37. The air valve spring 19, also in constant compression between the sliding air valve member 8 and the reaction plate 22, is also compressed upon forward movement of the sliding air valve 8. After seating of the air valve 17 with its mating valve seat 16, forward movement of the sliding air valve member 8 will unseat the vacuum valve 74 from the vacuum seat 18. At this point, these three springs 88, 19, and 67 transmit the reaction force from the fluid displacement member 37 as received from the reaction proportioning device and plunger.

As the sliding air valve continues forward, the reaction plate 22 seats itself upon the shoulder 23 on the forward end of the sliding air valve. At this point, the combined effect of the three springs 88, 19 and 67, together with the resilient bumpers 87 on the forward end of the valve seating member, provide for a dampened and soft seating of the reaction plate 22 on the shoulder 23. The action of the valves and the reaction proportioning device is the same as described in the previous paragraphs. The addition of spring 88 provides for a more constant "feel" through the initial portion of the stroke of the manual control means.

While the embodiments of the present invention as herein disclosed constitute preferred forms, it is to be understood that other forms might be adopted.

What is claimed is as follows:

1. In a power brake booster unit, comprising in combination; a power unit casing, a power wall within said power unit casing directly connected to a power transmitting member, said power wall dividing the internal portion of said power unit casing into two compartments, one compartment being a constant pressure compartment and the other compartment being a variable pressure compartment, a valve mechanism carried within said power wall for controlling the pressure in the variable pressure compartment, a reaction force proportioning device carried within said power wall, a manually operated slidable air valve, said power wall provided with a concentric cylindrical bore therein for receiving said slidable manually operated air valve, an annular vacuum valve portion formed in said power wall concentric with said air valve, a resiliently held valve seat for operating with said vacuum valve and said air valve and mounted concentrically within said power wall, said valve seat biased by resilient means to a closed position on said vacuum valve, resilient means on the forward end of said sliding air valve to bias said air valve in the open position, a reaction plate operatively engaging the forward side of said valve seat resilient member and said air valve resilient member, said reaction plate slidably connected on the forward portion of said sliding air valve, a shoulder on said sliding air valve to limit the rearward movement of said reaction plate in relation to said sliding air valve, said reaction proportioning mechanism contained within said power wall operating directly from said power transmitting member and including said reaction plate, said reaction device and said resilient members to provide a resilient feel on said manually controlled air valve in seating said reaction plate on said shoulder of said sliding air valve during the initial operation of said power unit.

2. A power brake booster unit, comprising in combination; a power unit casing, a power wall contained within the power booster unit casing and connected to a power transmitting member, one side of said power wall being an atmospheric pressure compartment, the opposite side of said power wall containing a variable pressure compartment, a valve mechanism carried in said power wall for controlling the pressure in said variable pressure compartment and comprising a valve housing with a bore receiving a sliding air valve, an annular vacuum valve formed on said valve housing, said sliding air valve having manual control means, an annular air valve portion formed on said sliding air valve concentric with said vacuum valve and spaced therefrom, an annular vacuum valve seat and an annular air valve seat, disposed within said valve housing and operatively positioned to engage said annular vacuum valve and said annular air valve, a resilient means, said annular vacuum valve seat biased by said resilient means to a closed position against said annular vacuum valve, a resilient member biasing said sliding air valve to a position away from said annular air valve seat and biasing said manual control means to a normally retracted position, said first mentioned resilient means and said second mentioned resilient member being positioned against a reaction plate slidably mounted on the forward end of said sliding air valve, said reaction plate operatively positioned in contact with a reaction force transmitting means engaging said power transmitting member, said reaction force device thereby transmitting a reaction feel to said air sliding valve by means of said resilient means and said resilient member during the initial movement of said sliding air valve.

3. A power brake booster unit, comprising in combination; a power unit having a power wall concentrically mounted therein, a power transmitting member directly connected to said power wall, said power wall dividing said power unit in two compartments, a constant pressure compartment and a differential pressure compartment, a valve mechanism carried within said power wall and including a valve housing having a cylindrical bore therein for reception of a mating portion of a sliding air valve, said valve housing having an annular vacuum valve formed concentrically as a part of said housing, said sliding air valve having an annular valve portion on its forward portion concentric within said valve housing, a valve seat member, a vacuum valve seat on said valve seat member for cooperatively engaging said vacuum valve, an air valve seat on said valve seat member mounted concentric with said vacuum valve seat in spaced relation to said vacuum valve seat, resilient means for biasing said valve seat member toward said vacuum valve, resilient means for biasing said slidable air valve away from said valve seat member to a normal position with the air valve in an open position thereby placing the two compartments within said power unit normally in communication with each other, a reaction plate, said air valve resilient means operatively engaging at one end said reaction plate with the opposite end operating against said sliding air valve and concentrically and slidably mounted on the forward end of said sliding air valve, said plate operating with a reaction proportion device mounted within said power wall and operated from said power transmitting member thereby providing a means of transmitting reaction force from the said power transmitting member, said resilient means biasing said valve seat member and said resilient means biasing said air valve also providing a resilient means of transmitting reaction force from the said power transmitting member to said manually operated control valve during the initial movement of said sliding air valve.

4. In a power brake unit, comprising in combination; a power unit casing, a power wall within said power unit casing connected to a power transmitting member, said power wall enclosing valve control means and reaction proportioning device, said power wall having a cylindrical bore extending inwardly from the rear of said power wall for receiving a sliding air valve, resilient means concentrically mounted on the forward end of said sliding air valve and compressively placed between a radial flange on the forward portion of said sliding air valve and said reaction proportioning device for returning said sliding air valve to a normally retracted position in spaced relation to its complementary valve seat, said reaction proportioning device having its rearward portion slidably mounted on said sliding air valve and engaging a seating shoulder in its rearward position, said air valve seat concentric with a vacuum valve seat and mounted on a member within said power wall having a flexible radially inner portion and biased to a normal rearward position by means of a resilient member closing said vacuum valve seat with its complementary vacuum valve, said vacuum valve being formed by means of an annular concentric ring on the forward end inner portion of said power wall, said resilient valve seat member having a flexible radial flange extending outward to a mounting portion concentrically mounted within said power wall, said radially inner portion having a bumper portion extending forward for engagement with the reaction proportioning device within said movable wall and thereby assisting in providing a softening action of said reaction proportioning device in engaging said seating shoulder on said sliding air valve by the combined action of said valve seating resilient means, said sliding air valve resilient means, and said bumper means.

5. In a power brake unit comprising in combination, a power unit casing, a movable wall within said power unit casing, said movable wall operatively connected to a power transmitting member, manual means for controlling valve control means enclosed within said movable wall, a reaction device within said movable wall, said movable wall having a cylindrical opening extending from the rearward portion for receiving a sliding air valve, said sliding air valve provided with an annular ridge on the forward side of a radial flange for cooperating with a valve seat, said radial flange on the sliding air valve adjoining a first cylindrical portion extending forward with a shoulder connecting a second cylindrical portion on the extreme forward end of said sliding air valve, said second cylindrical portion of said sliding air valve slidably received within a portion of said reaction device, resilient means concentrically mounted on said first cylindrical portion of said sliding air valve to compressibly mount said resilient means between said radial flange of said sliding air valve and the rearward portion of said reaction device to provide means for returning said sliding air valve to a normally rearward position, an annular bead formed concentrically within said movable wall to provide a vacuum valve within said movable wall, a valve seating member concentrically mounted within said movable wall forward of said vacuum valve and said air valve for cooperatively engaging said valves in controlling the operation of said power brake unit, said valve seat member concentrically mounted on its outer periphery within said movable wall and having a flexible radially inwardly extending flange adjoining a central cylindrical portion, said cylindrical portion having bumper means extending forward for engaging the rearward side of said reaction device, the rearward cylindrical portion of said valve seat member having a seating portion for concentrically engaging said vacuum valve and said air valve, resilient means compressively placed between the rearward side of said reaction device and said resilient portion of the seating member to bias said seating member in a closed position against said vacuum valve member, said valve seating spring and said air valve spring and said bumper means thereby providing a means for softening the seating of the said reaction device on the shoulder of the forward end of said sliding air valve during the initial operation of said power brake unit.

6. In a power brake unit comprising in combination, a power unit casing, a movable wall contained within said power unit casing and directly connected to a power transmitting member, said movable wall separating said power unit casing in two compartments, one having a variable pressure and the second having a constant pressure, said movable wall comprising a forward housing portion directly connected to said power transmitting member, said forward housing portion directly connected to a valve housing, said valve housing having a vacuum chamber and an air chamber enclosed therein, said valve housing provided with an opening extending from the rearward side of said valve housing for receiving a sliding air valve operatively controlled by a manual means, said sliding air valve provided with means about its outer periphery for sealing said variable pressure compartment within said power brake unit from the atmosphere, the forward portion of said sliding air valve provided with an annular bead to form an air valve, the extreme forward portion of said sliding air valve adjoining a radial flange adjacent to said annular bead provided with two cylindrical portions of different diameter connected by a shoulder, the rearward of said cylindrical portions for receiving a concentrically mounted spring for engaging the radial flange of said sliding air valve and the rearward side of said reaction proportioning device, the forward of said cylindrical portions for slidably receiving the rearward portion of said reaction proportioning device, a valve seat member having a common radial flange to provide a complementary seating surface for said air valve and a concentric vacuum valve for controlling communication of said variable pressure compartment with said air chamber and said vacuum chamber, said vacuum valve formed on the radially inner portion and forward side of said valve housing, resilient means disposed between the rearward side of said reaction proportioning device and said seat member, said resilient means biasing said vacuum seat to the closed position with said vacuum valve, said valve seat member having a radially extending flexible flange adjoining the mounting portion of said seating member, the mounting portion of said seating member engaging the radially inner periphery of said valve housing, said cylindrical portion on the radially inner section of said valve seating member provided with bumpers on their forward end, said bumpers combined with said vacuum valve seat resilient means and said sliding air valve resilient means to provide dampening movement of said reaction proportioning device on said sliding air valve during initial operation of said power brake unit.

7. In a power brake unit comprising in combination, a power unit casing, a power wall mounted within said power unit casing, said movable wall directly connected with a power transmitting member, said power wall including a forward housing member, said forward housing directly connected to a valve housing, said valve housing provided with a cylindrical bore extending inward from the rearward portion of said valve housing for receiving a sliding air valve adapted for operation by manual means, said sliding air valve provided with an annular bead to form the air valve portion of said member, said valve housing provided with a concentric annular bead to form a vacuum valve, a concentrically mounted valve seat for cooperatively engaging said vacuum valve and said air valve, said valve seat mounted on a flexible member to provide axial movement in relation to said valve housing having its radially outer portion rigidly mounted on said valve housing, said sliding air valve provided with a cylindrical portion for slidably receiving a reaction disc and a shoulder for seating said disc, a resilient member compressively disposed between said reaction disc and said valve seat member to bias said valve seat member in a closed position with said vacuum valve and to provide resilient seating of said reaction disc or a shoulder portion of said sliding air valve during initial operation of said booster unit, resilient means concentrically within said valve seating member and operatively disposed between a radial flange on the forward side of said sliding air valve and the rearward side of said reaction disc to bias said sliding air valve in spaced relation to its mating air valve seating portion to provide resilient seating of said reaction disc on said shoulder and to return said annular control means to a normally retracted position, said valve seat member provided with a resilient deformable forwardly extending portion operating as a means for resiliently seating said reaction disc on said shoulder during initial operation of said booster unit.

8. In a power brake unit comprising in combination, a power unit casing, a movable wall within said power unit casing operatively connected to a power transmitting member, said movable wall comprising a housing, said housing provided with a cylindrical opening extending inwardly from the rear of said movable wall and receiving a sealed sliding air valve adapted for manual control means, the forward portion of said housing enclosing a reaction transmitting means including a reaction disc slidably mounted on a first cylindrical forward portion of said sliding air valve, said sliding air valve having a shoulder portion for seating said reaction disc thereby limiting the rearward movement of said reaction disc in relation to said sliding air valve, said shoulder portion of said sliding air valve adjoining a second cylindrical portion of larger diameter than said first cylindrical portion, said second cylindrical portion adjoining a radial flange extending outward to an annular bead on said sliding air valve, a concentric annular bead formed within the housing of said movable wall forming a vacuum valve, valve seats provided on a common radial flange of a valve seat member for cooperatively engaging said air and said vacuum valves and mounted on a cylindrical portion extending forward and having bumper means, said cylindrical portion adjoining a radially extending flexible flange mounted within said housing, a valve seat spring compressibly mounted between said reaction disc and said valve seat member to provide means for biasing said vacuum valve seat to a closed position with said vacuum valve and also to provide means for softened seating of said reaction disc on said shoulder of said sliding air valve, said bumper means on the forwardly extending portion of the cylindrical central portion valve seat member providing softened seating means of said reaction disc on the shoulder of said sliding air valve, an air valve spring compressibly mounted between said reaction disc and said radial flange on said sliding air valve to provide return of said air valve member and means for returning said manual means to the retracted position and softening seating of said reaction disc on said shoulder of said sliding air valve during the initial operation of said power brake unit, a power transmitting member spring compressive mounted between said power transmitting member and said sliding air valve to directly transmit reaction force, soften the action of said manual control means, and bias said manual control means to a normally retracted position.

9. A power brake booster unit, comprising in combination; a power unit having a power wall concentrically mounted therein, a power transmitting member directly connected to said power wall, said power wall thereby dividing said power unit in two compartments, a constant pressure compartment and a differential pressure compartment, said power wall normally returned to a retracted position by means of a power wall resilient means, a valve mechanism carried within said power wall and including a valve housing having a cylindrical bore therein for reception of a mating portion of a sliding air valve, said valve housing having an annular vacuum valve formed concentrically as a part of said valve housing, said sliding air valve having an annular valve on its forward portion concentric within said valve housing, a valve seat member having a seat for cooperatively engaging said vacuum valve, said valve seat member also having an air valve seat mounted concentric with said vacuum valve seat in spaced relation to said vacuum valve seat, resilient means for biasing said valve seat member towards said vacuum valve, resilient means for biasing said slidable air valve away from said valve seat to a normal position with the air valve in a normally open position thereby placing the two compartments within said power unit normally in communication with each other, a reaction proportioning device concentrically mounted within said power wall and having a reaction plate slidably mounted on the forward end of said slidable air valve, said resilient means for biasing said slidable air valve operatively placed between said reaction plate and said sliding air valve to resiliently transmit a component of the opposing force of said power wall resilient means transmitted through said reaction proportioning device to said sliding air valve and said manual means during the first increments of movement of said sliding air valve, said resilient means for biasing said valve seat member toward said vacuum valve operatively positioned between said reaction plate and said valve seat member to resiliently transmit a portion of the component of an opposing force of the power wall resilient means transmitted through said reaction proportioning device to said sliding air valve and said manual control means during the second increment of movement of said sliding air valve during initial operation of said sliding air valve.

References Cited in the file of this patent

UNITED STATES PATENTS

| | | |
|---|---|---|
| 2,098,665 | Kliesrath | Nov. 9, 1937 |
| 2,735,268 | Stelzer | Feb. 21, 1956 |
| 2,763,989 | Ayers | Sept. 25, 1956 |
| 2,792,686 | Ingres | May 21, 1957 |
| 2,800,770 | Edge et al. | July 30, 1957 |
| 2,807,239 | Grant | Sept. 24, 1957 |
| 2,826,041 | Rike | Mar. 11, 1958 |
| 2,826,042 | Rike et al. | Mar. 11, 1958 |
| 2,832,316 | Ingres | Apr. 29, 1958 |
| 2,861,427 | Whitten | Nov. 25, 1958 |
| 2,862,365 | Ingres et al. | Dec. 2, 1958 |